Dec. 10, 1957     K. J. SYLVEST     2,815,987
DISCHARGE MEANS FOR SILOS
Filed Jan. 26, 1956     2 Sheets-Sheet 1
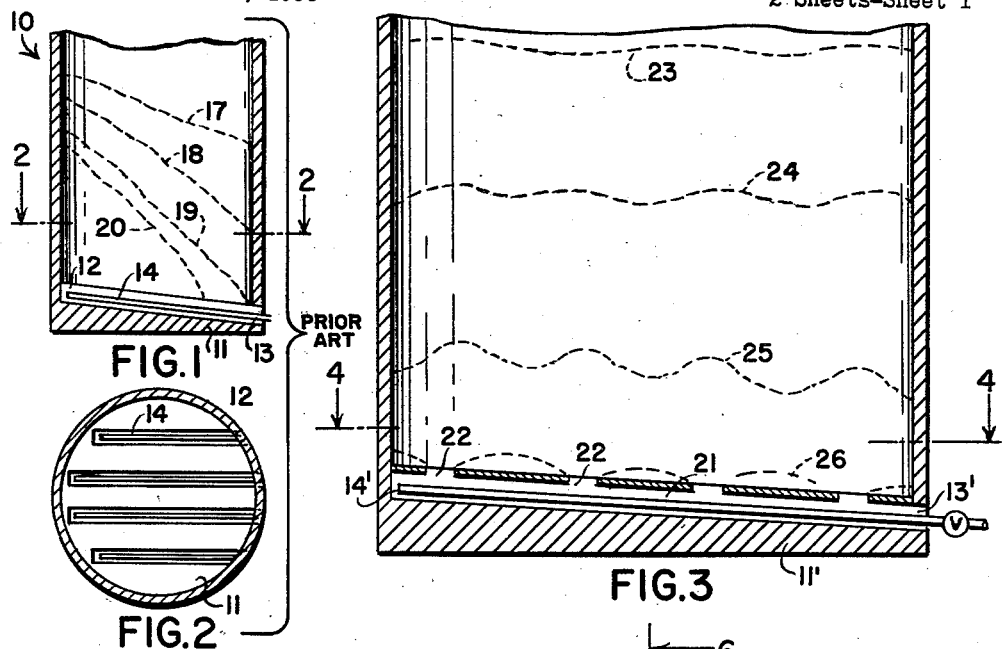
FIG.1   PRIOR ART
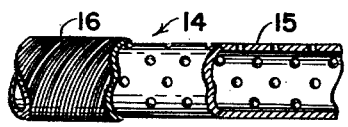
FIG.2
FIG.3
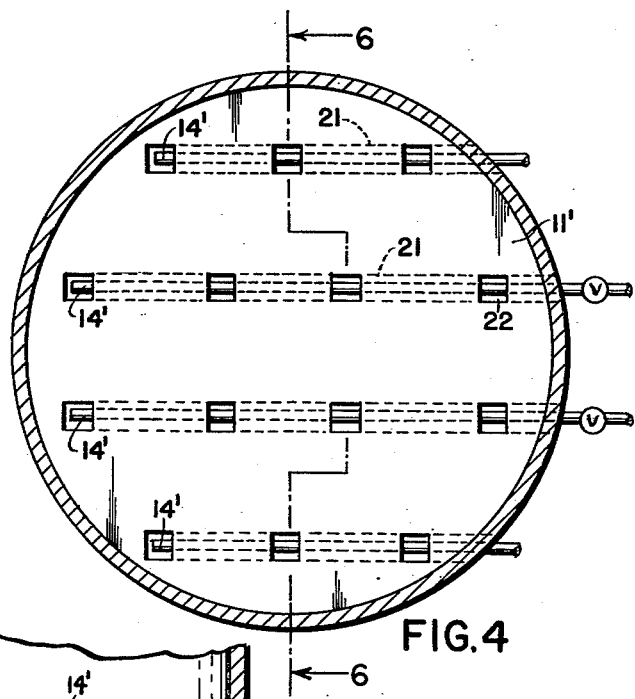
FIG.5
FIG.4
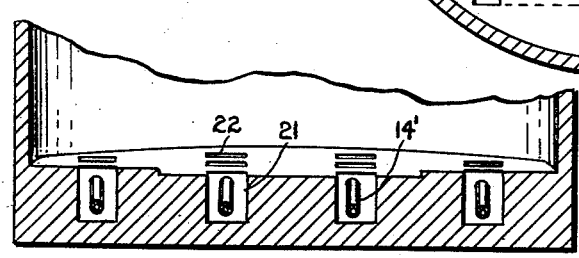
FIG.6
INVENTOR.
Karl Jens Sylvest
by
Pennie Edmonds Morton Barrows & Taylor
Attys Dec. 10, 1957 K. J. SYLVEST 2,815,987
DISCHARGE MEANS FOR SILOS
Filed Jan. 26, 1956 2 Sheets-Sheet 2

INVENTOR.
Karl Jens Sylvest
by
Pennie Edmonds Morton Barrows Taylor
Attys

2,815,987

DISCHARGE MEANS FOR SILOS

Karl Jens Sylvest, Copenhagen, Denmark, assignor to F. L. Smidth & Co., New York, N. Y., a corporation of New Jersey Application January 26, 1956, Serial No. 561,568

Claims priority, application Denmark January 28, 1955

9 Claims. (Cl. 302—52)

The present invention relates to apparatus for handling pulverulent or granular materials capable of being rendered fluent by aeration and is concerned more particularly with improved means for withdrawing such finely divided materials from a storage silo or bin.

Pulverulent materials, such as cement, for example, are often stored in large cylindrical silos having one or more outlet openings through their side wall near the bottom for removal of the material. Such a silo may be provided with a bottom sloping slightly toward the outlet openings and having a plurality of ducts containing means for aerating the material and rendering it fluent, so that it may flow through the ducts and out the discharge openings. Since it is complicated and expensive to provide ducts in close proximity through the entire area of the bottom of a silo, the ducts have heretofore been commonly spaced a distance greater than the width of the ducts. Such an arrangement of the ducts has the drawback that the material above the ducts at the side of the silo remote from the outlet openings tends to form bridges across the ducts and thus cannot be removed.

The silo discharge means of the invention overcomes the objection to the prior apparatus in a simple inexpensive manner by permitting the material to enter relatively widely spaced ducts only at selected spots or areas distributed over the silo bottom. The desired effect is obtained by partly covering the tops of the ducts, so that, although the material within the ducts is aerated throughout its travel through the ducts to the discharge openings, the material can enter the ducts only at the places where the ducts are not covered. With such an arrangement, the level of the material with the silo remains substantially horizontal during the entire discharge operation and almost complete discharge is achieved.

For a better understanding of the invention, reference may be made to the accompanying drawings, in which Fig. 1 is a fragmentary vertical cross-sectional view of a silo provided with the prior discharge means;

Fig. 2 is a cross-sectional view on the line 2—2 of Fig. 1;

Fig. 3 is a fragmentary vertical cross-sectional view of a silo provided with one form of the new discharge means;

Fig. 4 is a cross-sectional view on the line 4—4 of Fig. 3;

Fig. 5 is an enlarged fragmentary elevational view with parts broken away of aerating pipe suitable for use in the discharge means of the silo of Fig. 3;

Fig. 6 is a fragmentary cross-sectional view on the line 6—6 of Fig. 4;

Figure 11:
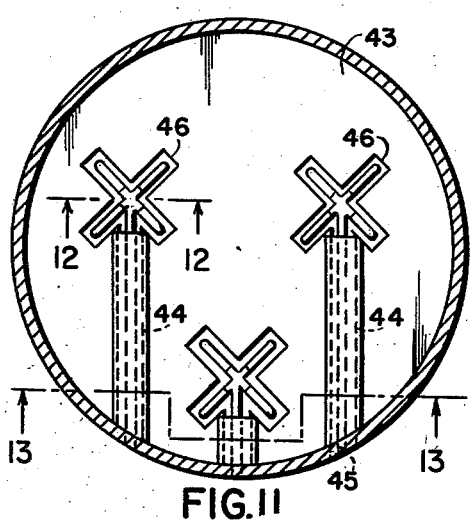
Figure 12:
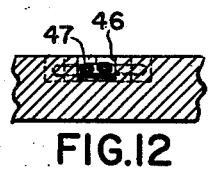
Figure 13:
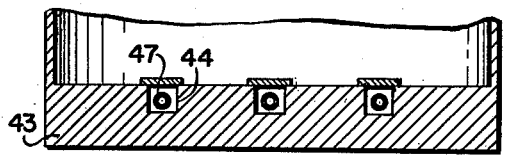

Fig. 11 is a horizontal cross-sectional view of a silo provided with a fourth form of the new discharge means; and Figs. 12 and 13 are cross-sectional views taken on the lines 12—12 and 13—13, respectively, of Fig. 11.

The silo 10 of Figs. 1 and 2 is of cylindrical form and has a sloping bottom 11. A plurality of parallel channels or ducts 12 with open tops are formed in the bottom and extend to openings 13 through the side wall of the silo at the lower side of the bottom. Each channel has one or more aerating pipes 14, which may be of the type shown in Fig. 5 and comprise a perforated metal tube 15 enclosed within a layer 16 of canvas or other suitable fabric acting as diffusing means for air escaping through the openings in the tube.

In discharging pulverulent material from the silo, air is supplied to the pipes 14 in the channels 12 and enters the material directly above the channels to aerate the material and render it fluent. The aerated material then flows through the channels and is discharged through the outlet openings 13. However, unless the channels are placed close together throughout the entire area of the base, the upper surface of the material being discharged will progressively assume the positions indicated by the lines 17—20, inclusive, of Fig. 1, because the material forms bridges over the channels at the side of the bottom remote from the openings 13. As a result, the discharge of material stops before the silo is fully emptied and manual or mechanical operations are required to remove the residual material.

In a silo equipped with the new discharge means, the difficulties mentioned are eliminated by providing the bottom of 11' of the silo with a plurality of ducts or channels 21 containing aerating pipes 14' and closing the top of each duct except for a limited number of openings 22 of relatively small size. The openings 22 are so spaced that there is an approximately even distribution of the openings 22 over the entire area of the bottom 11'. With this arrangement, the fluidizing air escaping from pipes 14' enters the material through the openings 22 and the aerated material enters the ducts through the openings and flows through the ducts and out through the discharge openings 13'. The distribution of the aerating openings over the bottom area eliminates bridging of the material and, during discharge, the upper level of the material moves downwardly in the silo substantially in the manner indicated by lines 23—26, inclusive, of Fig. 3 and substantially the entire contents of the silo may be discharged in a continuous operation.

Figure 7:
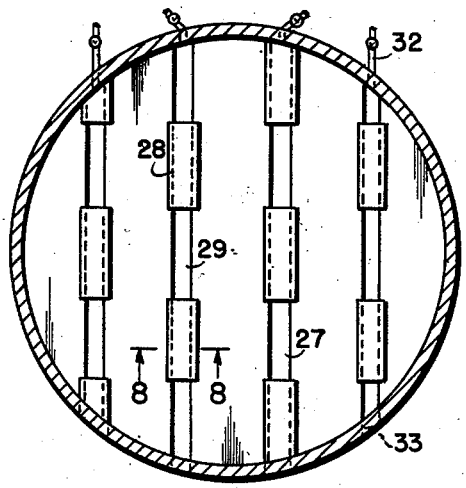
Fig. 7 is a horizontal cross-sectional view with parts removed of a silo provided with a second form of the new discharge means.
Figure 8:
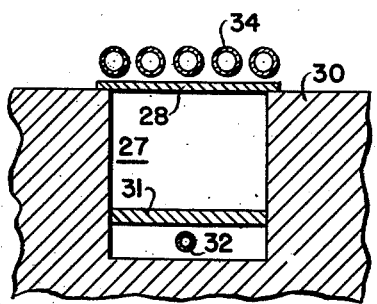
Fig. 8 is an enlarged fragmentary cross-sectional view on line 8—8 of Fig. 7.

A second form of the new silo discharge means is illustrated in Figs. 7 and 8 and it differs from that shown in Figs. 3 and 4 only with respect to the form of the material aerating means disposed within the ducts. The construction of Figs. 7 and 8 includes spaced parallel channels 27 having tops closed at intervals by means of plates 28 arranged to leave relatively long open portions 29 of the channels in even distribution over the area of the bottom 30 of the silo. Porous diaphragms 31 are disposed within the channels below the level of the silo bottom aand air supplied to the channels below the diaphragms through pipes 32 aerates and fluidizes material within the channels, so that the material will flow out through discharge openings 33. Auxiliary aerating pipes 34 may be mounted to overlie the plates 28, so that the material directly above the plates will be sufficiently aerated to flow through the openings 29 into the channels.

Figure 9:
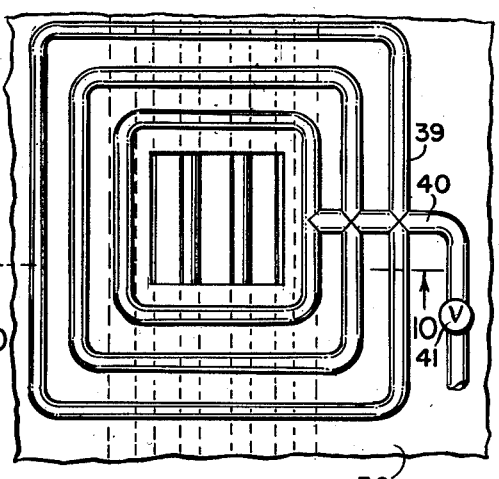
Fig. 9 is an enlarged fragmentary plan view of a third form of the new discharge means.
Figure 10:
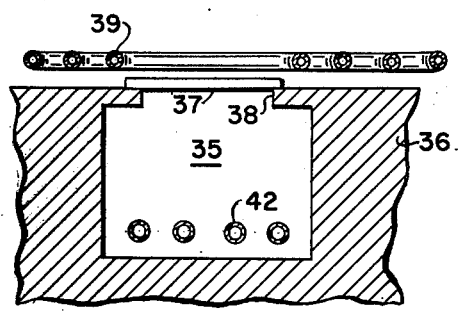
Fig. 10 is a cross-sectional view on the line 10—10 of Fig. 9.

The entrance of material into ducts 35 disposed in a silo bottom 36 and closed at the top by plates 37 to provide spaced openings 38 may be facilitated by surrounding each opening with a group of generally annular aerating pipes 39, as illustrated in Figs. 9 and 10. By supplying each such group of pipes 39 with air through a supply line 40 containing a valve 41, the aeration of material above the various openings can be controlled, so that the material may be discharged from selected parts of the silo as desired. The ducts 35 may contain aerating means, such as aerating pipes 42 similar to pipes 14, or porous diaphragms similar to diaphragm 31. Auxiliary aerating means above the duct closures, as shown in Fig. 8, or surrounding the openings through the closures, as shown in Fig. 9, may be used advantageously with all forms of the silo discharge means of the invention.

In the form of the silo discharge means shown in Figs. 11–13, inclusive, the bottom 43 of the silo is formed with a plurality of covered ducts 44 leading to discharge outlets 45. At the inner end of each duct, there is an open cross-shaped recess 46 and the recesses are distributed over the area of the bottom. The ducts and recesses contain aerating means, shown as aerating pipes 47. When air under pressure is supplied to the material through pipes 47, the material within the ducts 44 flows to the outlets 45 and material from the upper part of the silo enters the ducts through the recesses 46.

The various forms of the new discharge means have been illustrated and described as including ducts leading to discharge openings and sunk within the silo bottom. If desired, the ducts may be mounted upon the upper surface of the bottom, in which event removal of the material lying below the level of the tops of the ducts cannot be achieved merely by aeration. However, placing the ducts upon the upper surface of the bottom is less expensive than sunken ducts and such arrangement may be preferred for that reason.

I claim:

1. In a silo for storing pulverulent material having an inclined bottom and at least one outlet opening through its side wall adjacent the bottom, means for discharging the material from the silo comprising a plurality of ducts at the bottom of the silo for conducting material to the outlet opening, closures for the tops of the ducts, each duct having at least one inlet opening through its closure for receiving material from the silo, the openings in the duct closures being distributed over the area of the silo bottom, means for introducing air into and thereby rendering fluent the material within the ducts, and auxiliary means for introducing air into and thereby rendering fluent the material above the level of the duct closures.

2. The silo discharge means of claim 1, in which the greater part of the length of each duct is closed by its closure.

3. The silo discharge means of claim 1, in which the means for introducing air into the material within the ducts comprise a pipe extending lengthwise within each duct, the pipe having perforations and being enclosed in a layer of diffusing material.

4. The silo discharge means of claim 1, in which the ducts lie parallel and are of different lengths and each duct has a cross-shaped inlet opening for receiving material at its end remote from the silo outlet opening.

5. The silo discharge means of claim 1, in which the means for introducing air into the material within the ducts include air diffusing means within the ducts and means for supplying air thereto.

6. The silo discharge means of claim 1, in which the auxiliary means comprise air diffusing means disposed within the silo near the bottom thereof.

7. The silo discharge means of claim 6, in which the auxiliary air diffusing means are disposed adjacent the openings through the duct closures.

8. The silo discharge means of claim 7, in which the auxiliary air diffusing means are disposed above the duct closures.

9. The silo discharge means of claim 7, in which the auxiliary air diffusing means are air diffusing pipes surrounding the openings through the duct closures.

References Cited in the file of this patent

UNITED STATES PATENTS

| | | |
|---|---|---|
| 2,515,894 | Polk | July 18, 1950 |
| 2,565,835 | Adams | Aug. 28, 1951 |
| 2,715,549 | Shields | Aug. 16, 1955 |